United States Patent [19]

McIntyre et al.

[11] Patent Number: 4,724,063

[45] Date of Patent: Feb. 9, 1988

[54] CATALYST FOR THE ELECTROREDUCTION OF OXYGEN

[75] Inventors: James A. McIntyre; Robert F. Phillips, both of Midland, Mich.

[73] Assignee: The Dow Chemical Company, Midland, Mich.

[21] Appl. No.: 819,461

[22] Filed: Jan. 14, 1986

Related U.S. Application Data

[63] Continuation of Ser. No. 621,990, Jun. 18, 1984, abandoned.

[51] Int. Cl.⁴ .............................................. C25B 11/04
[52] U.S. Cl. .................................. 204/291; 204/290 R; 427/372.2
[58] Field of Search .................. 427/372.2; 204/290 R, 204/291

[56] References Cited

U.S. PATENT DOCUMENTS

| | | | |
|---|---|---|---|
| 3,297,490 | 1/1967 | Barber et al. | 133/122 |
| 3,346,678 | 10/1967 | Ohlgren | 204/29 |
| 3,671,591 | 6/1972 | Schwager et al. | 260/596 |
| 3,985,578 | 10/1976 | Witherspoon et al. | 429/44 |
| 4,013,461 | 3/1977 | Elbert | 75/212 |
| 4,090,978 | 5/1978 | Welsh et al. | 252/425 |
| 4,115,528 | 9/1978 | Christner et al. | 423/449 |
| 4,137,373 | 1/1979 | Jalan et al. | 429/44 |
| 4,143,217 | 3/1979 | Joo et al. | 429/218 |
| 4,271,045 | 6/1981 | Steigerwald et al. | 252/511 |
| 4,481,303 | 11/1984 | McIntyre et al. | 502/159 |

OTHER PUBLICATIONS

Derwent, 35987B/19 (554041296).
Carbon, 16, pp. 153–154, (1978).
"Thermal Degradation of Polymers . . .", E. Fitzer, Angew. Chem. Int. Ed. Engl., 19, 375–385.
G. M. Jenkins et al, Polymeric Carbons–Carbon Fibre, Glass & Char, Cambridge U. Press, 1976, pp. 1–96.

Primary Examiner—R. L. Andrews
Attorney, Agent, or Firm—James H. Dickerson, Jr.

[57] ABSTRACT

The invention is an electrochemical cell comprising:
(a) an anode; and
(b) a cathode having a pyropolymer present on at least a portion of its surface.

10 Claims, 3 Drawing Figures

CATALYST FOR THE ELECTROREDUCTION OF OXYGEN

CROSS-REFERENCE TO RELATED APPLICATION

This is a continuation, of application Ser. No. 621,990 Filed June 18, 1984 now abandoned.

BACKGROUND OF THE INVENTION

This invention concerns new electrocatalysts active for the electroreduction of oxygen, and particularly a new polymeric carbon catalyst.

Within the field of electrochemistry, there is a well-known type of an electrolytic cell known as a chlor-alkali cell. Basically this is a cell wherein chlorine gas and caustic soda are produced by passing an electric current through a concentrated brine solution containing sodium chloride and water. A large portion of the chlorine and caustic soda for the chemical and plastics industries is produced in chlor-alkali cells. The cathodes employed in such chlor-alkali cells are subjected to the corrosive environment of the caustic soda.

Chlor-alkali cells are divided by a separator into anode and cathode compartments. The separator characteristically can be a substantially hydraulically impermeable membrane, e.g., a hydraulically impermeable cation exchange membrane, such as the commercially available NAFION® manufactured by the E. I. du Pont de Nemours & Company. Alternatively, the separator can be a porous diaphragm, e.g., asbestos, which can be in the form of vacuum deposited fibers or asbestos paper sheet, as are well known in the art. The anode can be a valve metal, e.g., titanium, provided with a noble metal coating to yield what is known in the art as a dimensionally stable anode.

One of the unwanted by-products present in a chlor-alkali cell is hydrogen which forms at the cell cathode according to the following reaction $2H_2O + 2e^- \rightarrow H_2 + 2OH^-$, $E^\circ = -0.828$ volts. This production of hydrogen increases the power requirement for the overall electrochemical process, and eliminating its formation is one of the desired results in chlor-alkali cell operation.

Fairly recently, attention has been directed in chlor-alkali cell technology to various forms of oxygen cathodes. In operation, an oxygen electrode is positioned in a chlor-alkali cell and contacted with an aqueous electrolyte on one side and an oxygen-containing gas on an opposing side. Oxygen electrodes are porous and allow the electrolyte and the oxygen-containing gas to permeate into the electrode to form a three-phase interface between the electrolyte, the oxygen-containing gas and the electrode surface. Electrical energy is supplied through the cathode and causes reactions to occur between the electrolyte and the oxygen. The reactions are throught to occur as a two-step reaction, with the overall reaction described by:

(1) $O_2 + H_2O + 2e^- \rightarrow HO_2^- + OH^-$
(2) $2HO_2^- \rightarrow O_2 + 2OH^-$

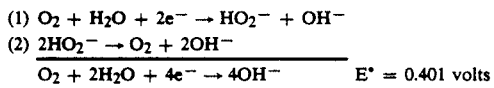

This represents a potential theoretical voltage savings of 1.229 volts. If only a portion of this theoretical voltage savings could be realized, a substantial amount of energy could be saved.

Catalysts active for the elctroreduction of oxygen are commonly placed on the electrode surface to enhance the reactions. Commonly used catalysts include, for example, gold, osmium, palladium, platinum, silver, and carbon. Carbon is the preferred catalyst because it is substantially cheaper than most other catalysts and is more readily available. However, carbon is catalytically active for only the first step of the two-step reaction. Thus, when carbon is used as the catalyst, another catalyst (active for the second step of the two-step reaction) is needed.

A chemically stable, electrically conductive carbon catalyst active for both steps of the two-step oxygen reduction reaction would be highly desirable. It is an object of the invention to provide such a catalyst.

SUMMARY OF THE INVENTION

The invention is an electrochemical cell comprising:
(a) an anode; and
(b) a cathode having a pyropolymer present on at least a portion of its surface.

DETAILED DESCRIPTION OF THE INVENTION

Figure 1:
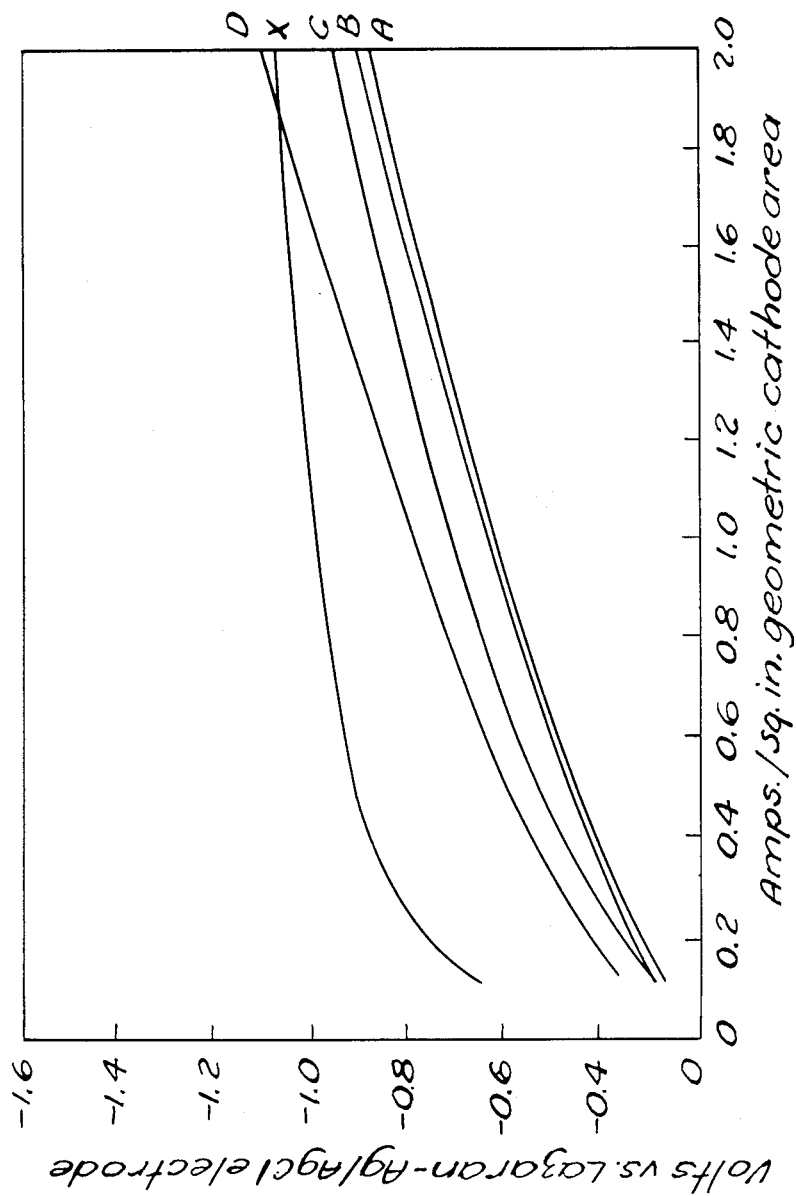
FIG. 1 is a graph which illustrates the potential in volts as a function of current density for various electrodes.

The present invention is centered around the discovery that particular known forms of carbon are catalytically active for both steps of the two-step oxygen reduction reaction referred to in the Background of the Invention.

A group of aromatic or polyaromatic compounds, referred to herein as "polymeric precursors", may be converted into carbon compounds which are catalytically active for both steps of the two-step oxygen reduction reaction. These catalytically active carbon compounds are referred to herein as "pyropolymers." Pyropolymers may, in turn, be heated to temperatures where they lose substantially all of their non-carbon content and form high molecular weight polymers. These polymers are referred to herein as "polymeric carbon" and their formation should be minimized because they are fragile and flake off the electrode easily.

Pyropolymers are thought to be a low hydrogen content, cross-linkable aromatic network of structures which are in a ribbon-like configuration. This ribbon-like structure apparently gives them very good mechanical properties. Such pyropolymers are known to be resistant to oxidation, salt solutions, organic solvents and alkaline solutions. They are also known to have a very high surface area. However, it had not been discovered, prior to the present invention, that pyropolymers were excellent catalysts for both steps of the two-step oxygen reduction reaction, discussed earlier. It has been discovered that not only are pyropolymers an excellent oxygen reduction catalyst, but, because of their high surface area, provide a substantial increase in the overall kinetics of the oxygen reduction reaction.

As used herein, "roughness factor" is the ratio of the actual surface area of a body to the geometrical surface area of the body. The roughness factor may be determined using the following procedures: standard gas adsorption techniques for measuring the surface area of the electrode. For example, the BET (Brunauer, Emmett, Teller) technique, well-known to scientists, would be used to measure the surface area of the electrode. This are is commonly expressed in $m^2/g$. Next, the electrode is weighed, and the geometrical area per gram is calculated. The roughness factor is the ratio of the true (BET) area to the geometric area (common weight basis) and is thus dimensionless.

Pyropolymers have roughness factors as high as about $1 \times 10^5$. This compares with porous Ni substrates (having a plurality of approximately 10 micron pores) which have roughness factors on the range of from about 400 to about 800, and with non-porous bodies which have roughness factors of about 1. Thus, pyropolymers provide surface areas which are orders of magnitude greater than non-porous, uncoated substrates.

The transition between a polymeric precursor and the formation of a pyropolymer is a gradual one. The transition is characterized by a loss of chemical groups such as methyl and hydroxyl groups. The specific temperatures at which these groups are lost depends upon the polymeric precursor and the nature of the groups. The loss of groups can be monitored using a variety of analytical techniques, including infrared spectroscopy (I.R.). I.R. measures the range of wavelengths in the infrared that are absorbed by a specimen. This absorption data may be used to determine the molecular constitution of the sample. Knowing the molecular constitution of the material allows monitoring of the loss of groups, thus allowing detection of the presence of a pyropolymer.

A pyropolymer is present when the I.R. spectra of a pyrolyzed polymeric precursor shows it to be substantially completely devoid of absorption peaks, except for the carbon-hydrogen absorption peak which is located in the 600–900 $cm^{-1}$ range. See "Infrared Study of Structural Changes During the Pyrolysis of a Phenol-Formaldehyde Resin," K. Ouchi, *Carbon*, Volume 4, pp. 59–66, for a detailed discussion about the I.R. techniques and results on converting phenol-formaldehyde into a pyropolymer.

If pyropolymers are heated to temperatures higher than their formation temperature, they lose hydrogen. When a pyropolymer has been heated sufficiently (usually greater than about 1000° C.) to cause it to lose substantially all of its hydrogen, it is referred to as a polymeric carbon. The transition between a pyropolymer and a polymeric carbon is a gradual one and there is no clear line of demarcation between a pyropolymer and a polymeric carbon. Since the formation of polymeric carbon corresponds with the loss of hydrogen, gas analysis may be easily used to detect the conversion of a pyropolymer into a polymeric carbon. For the purpose of this invention, the formation of polymeric carbons should be minimized.

Polymeric precursors suitable for use in the present invention are aromatic or polyaromatic organic compounds and include, for example, phenol-formaldehyde, polyvinyl alcohol, poly(2,6-diphenyl-p-phenylene oxide), acenaphthylene, phenolic resins, rayon, polyacrylonitrile, polyfurfuryl alcohol and mixtures thereof. Phenolformaldehyde is particularly preferred because it is readily available, soluble in common solvents, thermally crosslinkable at 100°–200° C. and does not require a catalyst for polymerization. Examples of commercially available phenol-formaldehyde resins which are suitable for use and which are Resin B PF (phenol-formaldehyde) available from The Dow Chemical Company and Byphene ® 850-W-77, available from Sherwin-Williams Inc.

Converting polymeric precursors into pyropolymers involves pyrolysis of the polymeric precursors at temperatures of from about 200° C. to about 1000° C. Pyrolysis appears to be a two step process:

(1) curing, or polymerizing, the polymeric precursor; and (2) converting the cured polymer into a pryopolymer.

Naturally, the temperatures at which these steps occur depend upon the particular polymeric precursor being used.

In accordance with one embodiment of the invention, phenol-formaldehyde is the polymeric percursor. Thermogravemetric analysis of a phenol formaldehyde/resin, heated at 5° Celsius/minute, showed the first weight loss occurring in the 80° to 200° Celsius range. This was thought to be the result of the vaporization of water and low molecular weight organic materials and the polymerization (curing) of the phenol-formaldehyde (which produces water). At 400°–450° celsius, weight loss increased, indicating what is thought to be the conversion of the polymer into a pyropolymer.

It is important to note that the curing of the polymeric precursor may be accomplished catalytically, as well as thermally. However, to minimize the amount of unnecessary components in the coating, thermal curing is preferred. Preferably, thermal curing is performed in an inert atmosphere.

Temperatures greater than about 1000° Celsius tend to produce substantially more polymeric carbon and less pyropolymer, than do temperatures less than about 1000° Celsius. Polymeric carbons are characterized by their loss of a substantial portion of hydrogen which is otherwise tied up with the carbon, while, on the other hand, pyropolymers retain a substantial amount of their hydrogen. Although polymeric carbons are catalytically active and electrically conductive, they are brittle and, when used as electrodes or electrode coatings, tend to flake off. Pyropolymers, on the other hand, are not only adherent, but are relatively flexible and do not flake off easily.

The heating time for converting the polymeric precursor into a pyropolymer has been found to be at least about 10 minutes and more preferably at least about 30 minutes. Most preferably, heating times are at least about 1 to 4 hours. Preferably, heating is conducted in an inert atmosphere to minimize oxidation of the carbon. For example, argon atmospheres have been determined to be suitable.

Optionally, the polymeric precursor may contain metallic impurities such as silver, manganese and iron. Such impurities are commonly beneficial when the pyropolymers of the present invention are used on oxygen depolarized electrodes in chlor-alkali cells, because the metallic impurities frequently act as peroxide decomposition catalysts and enhance the desired production of hydroxyl ions.

To use pyropolymers as catalysts for the reduction of oxygen, they may first be formed into a body suitable for use as an electrode, or coated onto substrates which are used as electrodes. Forming the entire electrode of a pyropolymer would be wasteful since a substantial portion of the pyropolymer would not be exposed on the surface. Preferably, therefore, pyropolymers are coated onto the surface of substrates.

Substrates suitable for coating with pyropolymers are preferably electrically conductive. However, they need not be electrically conductive since the pyropolymer is conductive and will, therefore, provide a pathway for the passage electrical current across the electrode. Preferably substrates are materials which will not substantially soften nor deform at the operating temperatures of the electrochemical cells in which they are used. It is not necessary that the substrate be chemically resistant to the contents of a cell in which it will be used, because it is protected by the pyropolymer coating. Preferably, however, the substrate is chemically resistant to the contents of the cell since it may not be completely coated with pyropolymer.

The substrate may be a non-porous body having a roughness factor near 1, or it may be a porous body having a roughness factor greater than 1. If the substrate is a porous body, preferably the pores are open and form a plurality of interconnected passageways throughout the electrode. This provides the maximum amount of surface area upon which the pyropolymer may be deposited.

Suitable substrate materials include, for example, solid or porous metals and ceramics.

Polymeric precursors may be applied to substrates in a variety of ways. A particularly convenient means is dissolving, or dispersing a polymeric precursor in a solvent and applying the dispersion, or solution, onto the substrate. This may be conveniently accomplished by dipping the substrate into the dispersion, or solution, painting, or spraying the dispersion onto the substrate, or a variety of other ways well known in the art. In the case of porous substrates, the dispersion, or solution, may also be pulled through the porous substrate using a vacuum. This causes the dispersion, or solution, to fill at least a portion of the passageways of the porous body, which yields the maximum amount of polymeric precursor in contact with the passageway walls of the body.

Solvents

Solvents suitable for use in the present invention may be easily determined by consulting a handbook of chemistry after a polymeric precursor has been selected. Solvents should not, however, be compounds which interfere with the conversion of the polymeric precursor into a pyropolymer. Preferred solvents for use in the present invention are organic solvents, because of their availability and their low vaporization temperature. The particular organic solvent selected depends upon the particular polymeric precursors being used, and usually includes acetone and methylene chloride. Acetone is a particularly preferred solvent because it is readily available and will readily dissolve most polymeric precursors.

The concentration of the polymeric precursor in the solvent may vary over a rather wide range, so long as the concentration is great enough to deposit an operable amount of polymeric precursor onto the surface of the substrate. Highly viscous solutions, or dispersions, of polymeric precursors may be easily used to coat non-porous bodies. However, highly viscous solutions may be not suitable for treating porous substrates because the viscosity of the solution may prevent it from entering some of the internal passageways of porous substrate. Thus, when a porous substrate is being coated, the use of highly viscous solutions, or dispersions, should be avoided. The viscosity of a particular solution, or dispersion, depends upon the amount of solvent and polymeric precursor being used.

For example, when phenol-formaldehyde (polymeric precursor) is dissolved in acetone (solvent), operable phenol-formaldehyde concentrations have been found to be from about 0.02 to about 6.0 grams of phenol-formaldehyde per gram of acetone. Operable concentrations for other polymeric precursors and solvents may be easily determined using routine experimentation.

Conversion of polymeric precursors into pyropolymers results in a decrease of the volume of the material. The volume of the material may decrease as much as up to about 40 percent. When pyropolymers are formed in situ on the surface of a substrate, this reduction in volume can cause the substrate to shrink. In a non-porous body, this shrinkage is of minimal significance. However, in porous bodies, the shrinkage can reduce the linear dimensions of the substrate up to about 3 to 5 percent of its total length and width. Likewise, such shrinkage can cause the average diameter of the passageways to decrease. If final dimensions of the coated substrate are critical, this phenomenon should be taken into account when the uncoated substrate is sized.

Optionally, catalytically active materials may also be present on the electrode surface. They may be blended with the polymeric precursor or with the pyropolymer and applied to the electrode surface, or they may be applied to the electrode surface after the application of the polymeric precursor or pyropolymer. Catalysts may be applied as metals or as thermally decomposable metal salts which are later decomposed. Useful catalysts are known to include Fe, Ni, Cu, Cr, Ag, Au, Pt, Pd, and Mn.

The loading level of a pyropolymer on a substrate depends, somewhat, on the characteristics of the substrate. Non-porous substrates may have any operable amount of pyropolymer on their surface. However, pyropolymer levels lower than about 0.001 milligram/square centimeter of substrate surface area are so low, they are of negligible value.

Likewise, for porous substrates, levels below about 0.001 milligram of pyropolymer/square centimeter of actual surface area, are so thin they are of negligible value. However, on porous substrates too much pyropolymer may wholly or partially block at least a portion of the pores of the substrate.

For purposes of illustration, a porous nickel substrate having about 10 micron diameter interconnecting pores may be suitably coated with the pyropolymer of phenol formadehyde at levels of from about 0.001 to about 0.05 milligrams of pyropolymer/square centimeter of actual substrate surface area. Optimal levels have been found to be from about 0.008 to about 0.025 milligrams pyropolymer/square centimeter of actual substrate surface area.

Cell Operation

Electrodes having pyropolymers on at least a portion of their surface are suitable for use in a variety of electrochemical processes in which oxygen is electrochemically reduced. For example, they have been found to be useful as oxygen depolarized cathodes in chlor-alkali elctrolytic cells. Chlor-alkali cells contain an anode in an anode compartment, a cathode in a cathode compartment and a diaphragm or ion exchange membrane separating the cathode compartment from the anode compartment.

In such cells, the cathode may be a porous member contacted on one side with an electrolyte and on another side with an oxygen-containing gas. The electrolyte and the gas form a gas-liquid interface inside the cathode. A power supply is externally connected to the anode and to the cathode and current is caused to pass between the electrodes and through the electrolyte. The voltage and the current are adjusted to a level which causes electrochemical reactions to occur at the electrodes.

Chlorine gas is produced at the anode and hydroxyl ions are produced at the cathode. The pyropolymer present on the surface of the cathode catalyzes the formation of hydroxyl ions at the cathode.

EXAMPLES

The methods for preparing the using electrodes having pyropolymers present on their surface are illustrated in the following examples.

EXAMPLE 1

This example illustrates the deposition of a polymeric precursor onto a substrate and its conversion into a pyropolymer.

A phenol-formaldehyde "B" resin (polymeric precursor) made by The Dow Chemical Company was dissolved in acetone (solvent) to produce a solution containing about 0.2 grams of phenol-formaldehyde resin per gram of acetone. The phenol-formaldehyde resin was analyzed using Plasma Emission Spectroscopy for metal ions. Analysis showed the following:

| Component | ppm |
|---|---|
| Fe | 700 |
| Ca | 5 |
| Mg | 2 |
| Pb | 43 |
| Sn | 2 |
| Ni | * |
| Cu | * |
| Al | * |
| Mn | * |
| Cr | * |

*None detected.

An approximately one square inch porous nickel substrate was obtained from Gould Inc. The nickel substrate had two layers. One layer was approximately 0.5 mm thick and had a plurality of passageways approximately 5 microns in diameter passing therethrough. Those passageways connected to a plurality of passageways passing through a second layer of porous nickel. The second layer was approximately 1.25 mm thick and had a plurality of passageways having diameters approximately 10 microns in diameter. The uncoated substrate had a roughness factor of about 1000.

The phenol-formaldehyde/acetone solution was brushed onto the nickel substrate. The nickel substrate was heated to about 80° Celsius to evaporate the acetone. The phenol-formaldehyde resin was then cured by maintaining the coated substrate at about 80° Celsius for about 16 hours in air.

The cured resin was converted into a pyropolymer in an electrically heated tube furnace under an atmosphere of argon which had been passed over hot titanium powder to remove residual oxygen. The coated substrate was placed in the unheated furnace and the furnace was turned on. Over a period of about 30 minutes, the furnace heated the coated substrate to a temperature of about 700° Celsius. The temperature was maintained at about 700° Celsius for about 30 minutes and the furnace was turned off. The furnace and sample were allowed to cool and the coated substrate was removed from the furnace. The entire heating and cooling cycle tool about 2 hours.

The coated substrate had approximately 0.02 milligram of pyropolymer/square centimeter of actual substrate surface area and had a roughness factor of about $1.5 \times 10^5$. This coated substrate was designated electrode A.

EXAMPLE 2

Three additional electrode substrates were prepared according to the procedures in Example 1, but using differing concentrations of phenol-formaldehyde dissolved in the acetone. This procedure produced substrates coated with varying amounts of phenol-formaldehyde pyropolymer.

| Designation | Grams phenolformaldehyde per gram acetone | Milligrams Phenol-formaldehyde Pyropolymer/ $cm^2$ Actual Surface Area | Roughness Factor |
|---|---|---|---|
| B | 0.14 | 0.015 | $1 \times 10^5$ |
| C | 0.08 | 0.009 | $0.7 \times 10^5$ |
| D | 0.02 | 0.003 | $0.2 \times 10^5$ |

EXAMPLE 3

This example shows the simultaneous pyrolysis of phenol-formaldehyde and a catalytically active metal salt.

A porous nickel substrate, as described in Example 1, was brush coated with a solution containing 0.18 grams of phenol-formaldehyde, 0.007 grams of $AgNO_3$, and 1 gram of acetone.

The coated sample was heated in the manner described in Example 1. The phenol-formaldehyde was cured and converted into a phenol-formaldehyde pyropolymer and the $AgNO_3$ was thermally decomposed into Ag. The final sample was found to have a roughness factor of about $1.3 \times 10^5$. The sample had a phenol-formaldehyde loading level of 0.0194 grams/$cm^2$ and an Ag loading level of 0.0030 grams/$cm^2$. This sample was designated electrode E.

EXAMPLE 4

This example shows the electrodeposition of a catalytically active metal onto a porous nickel substrate, followed by deposition and formation of a phenol-formaldehyde pyropolymer.

A 3.8 cm square porous nickel substrate having a 0.6 cm pressed border was filled with a solution containing 100 grams per liter of AgCN and 54 grams per liter of KCN. The filled electrode was placed in an electrochemical cell and current was passed through the body to cause the Ag to elctroplate into the surface of the nickel substrate. This electroplating procedure is described in detail in U.S. Pat. No. 4,204,918 issued to James A. McIntyre, Robert F. Phillips and Joseph D. Lefever.

The silver coated substrate was found to have a roughness factor of about 1500.

Subsequently, the silver coated substrate was treated with a phenol-formaldehyde/acetone solution according to the procedures described in Example 1. The resulting sample had a pyropolymeric loading level of 0.0161 grams/cm$^2$ and a silver loading level of 0.0030 grams/cm$^2$. It was found to have a roughness factor of about $1 \times 10^5$. This coated substrate was designated electrode F.

EXAMPLE 5

This example shows the deposition and formation of a phenol-formaldehyde pyropolymer onto a porous nickel substrate followed by electrodeposition of a catalytically active metal onto the phenol-formaldehyde pyropolymer.

A 3.8 cm square substrate of porous nickel like the one described in Example 1 was brush treated with a phenol-formaldehyde/acetone solution and converted into a phenol-formaldehyde pyropolymer according to the procedures in Example 1.

Subsequently, the substrate was electroplated with Ag using the electroplating procedure described in Example 4. The coated substrate was found to have a roughness factor of about $1.3 \times 10^5$. The sample had a pyropolymer loading level of 0.0194 g/cm$^2$ and a Ag loading level of 0.003 g/cm$^2$. This electrode was designated G.

EXAMPLE 6

This example shows the results from using the electrodes prepared in Examples 1–5 as cathodes in an oxygen depolarized electrolytic cell.

The electrochemical cells used to test the electrodes of the present invention contained an anode, a cathode, a reference electrode, a thermowell and an immersion heater. The anode consisted of a 0.15 mm thick nickel sheet 1.2 cm by 15 cm. The cathode was the electrode prepared above. The reference electrode was a Lazaran ® Ag/AgCl electrode with all polytetrafluoroethylene bodies (available from Beckman Inc.). An electrically operated immersion heater was used to heat the electrolyte to a temperature of about 70° Celsius during operation of the cell. The cathode was held in place by a top plate which rested on the cell cover. The cathode consisted of a plexiglas oxygen gas chamber and the electrodes prepared in the examples above. Oxygen gas was supplied from a cylinder to the gas chamber. The flow and pressure of the oxygen were controlled to provide a flow of about 0.5–10 ml/min. at a pressure of about 4 psig. A power supply was connected to the anode and the cathode.

The cells were operated to produce hydroxyl ions at the cathode and oxygen at the anode.

Cathode Reaction: 
$2H_2O + O_2 + 4e^- \rightarrow 4OH^-$

Anode Reaction: 
$4OH^- \rightarrow 2H_2O + O_2 + 4e^-$

No separator was used between the anode and the cathode.

The cell was operated at cathode current densities of from about 15 to about 310 mA/cm$^2$ of geometric surface area of the cathode. After 24 hours of operation, the operating voltages were noted and recorded for each electrode. In addition, a porous nickel substrate like the one used to prepare electrodes A–G was heat treated using the heating cycle described in Example 1. This electrode, however, had no surface coating whatsoever. It was used for comparison purposes and was designated electrode X.

FIG. 1 shows the results obtained when the electrodes prepared in Examples 1 and 2 (Samples A, B, C and D), and the uncoated heat treated substrate were tested in the cell described above.

In the graph, lower voltages at a given current density show more efficient operation of the cell. Reduction in the operating voltage at a given current density is highly desirable since substantial amounts of energy are being conserved.

FIG. 1 shows that all electrodes coated with a pyropolymer (A, B, C and D) operate at a substantially more positive potential than does the uncoated heat treated substrate (X), with the exception of D, which did not show an improvement at high current densities. FIG. 1 also shows that voltage reduction is directly proportional to the amount of pyropolymer present in the surface of the substrate. For example, an electrode coated with pyropolymer at a loading level of 0.009 mg/cm$^2$ actual surface area (C) operates at a more positive potential than does an electrode coated with pyropolymer at a loading level of 0.003 g/cm$^2$ (D).

Figure 2:
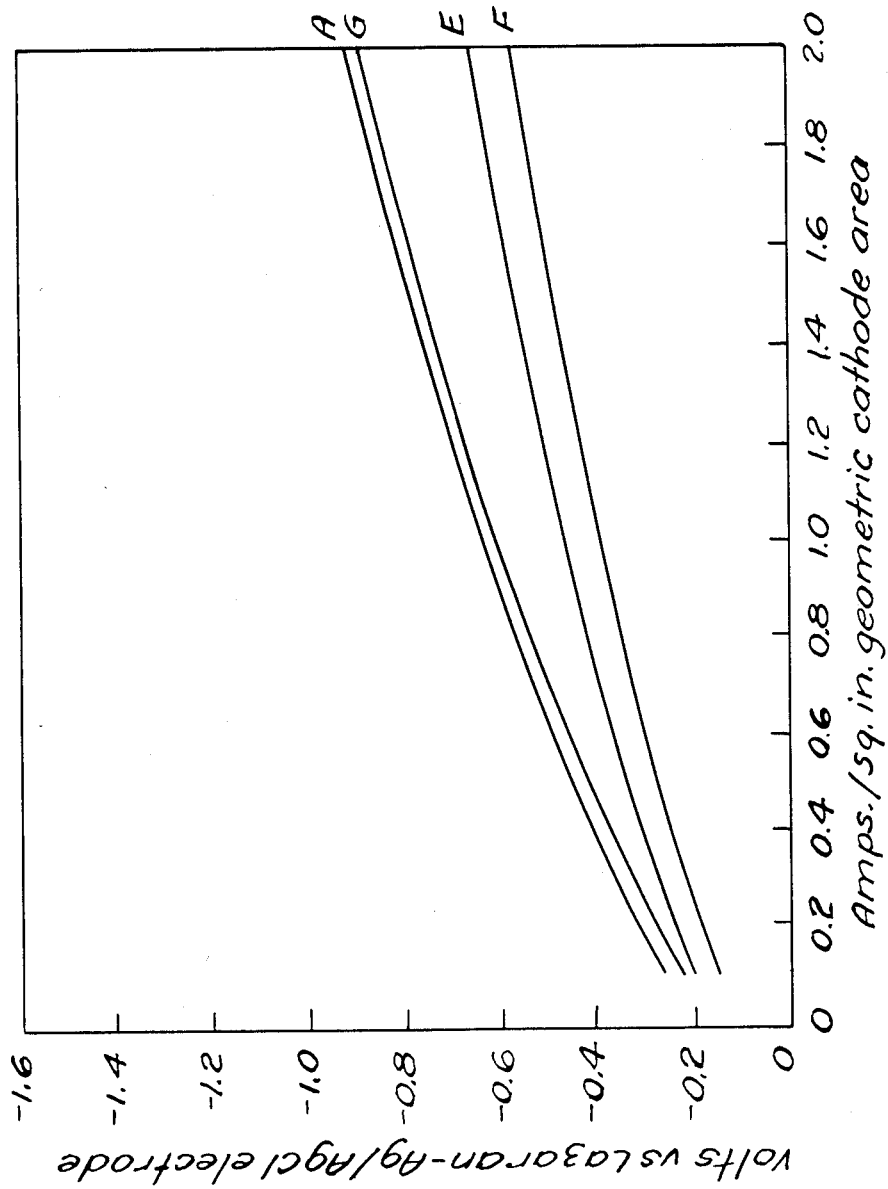
FIG. 2 is another graph which illustrates the potential in volts as a function of current densities for various electrodes.

FIG. 2 shows the effect of the presence of a catalytically active component in addition to the pyropolymer (E, F, and G). These are compared to a substrate coated with pyropolymer only (A). The loading levels for A, E, F and G were as noted previously. FIG. 2 also shows the effect of the sequence of applying the Ag and the pyropolymer.

FIG. 2 shows that electrodes E, F and G, (coated with a pyropolymer/metal catalyst mixture) give better results than those coated only with a pyropolymer (A).

Of the three samples coated with a pyropolymer and silver, the sample having Ag electroplated onto the substrate prior to the deposition of the pyropolymer (F) gave the best results, followed by the substrate coated simultaneously with a silver precursor and a polymeric precursor and thermally treated (E). Next, in performance, was the sample in which silver was electroplated onto the substrate after the pyropolymer had been found on the substrate (G).

EXAMPLE 7

This example shows long term results obtained from electrodes coated with a pyropolymer and a silver catalyst. This also shows the effect of the current density at which the cathode is operated, the effect of the use of "dry" oxygen as compared to the use of "wet" oxygen, and the effect of washing the electrodes with water.

Figure 3:
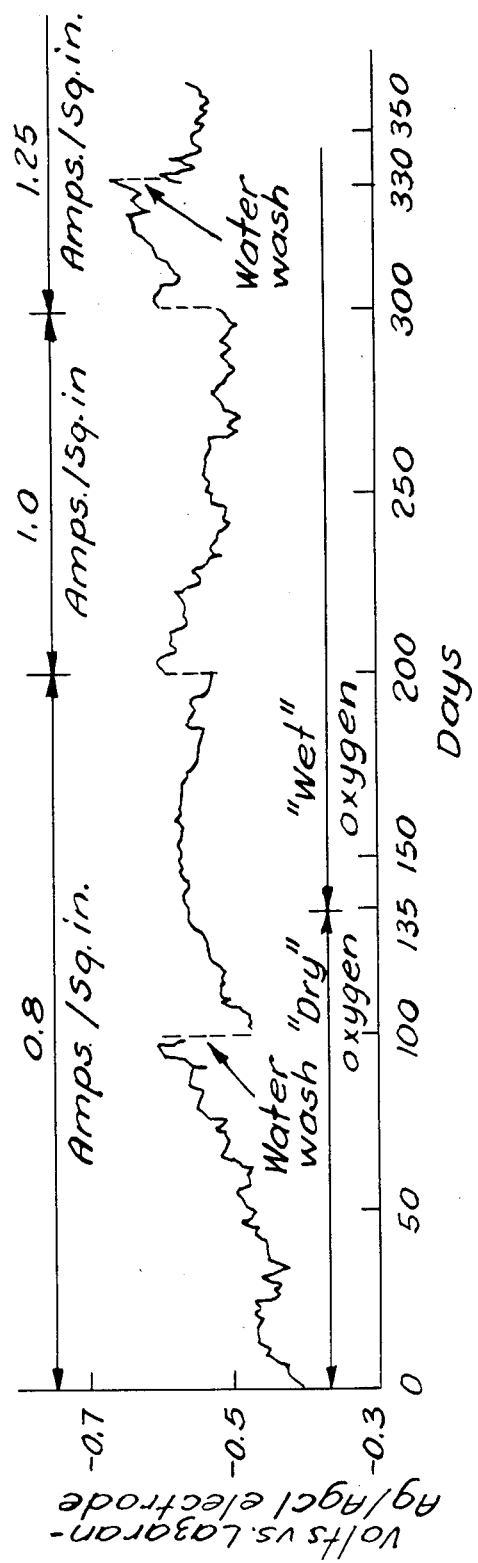
FIG. 3 is a graphical illustration showing potential in volts as a function of days for an electrode operated at various current densities.

This electrode prepared in Example 3 (E) was tested in the electrolytic cell described in Example 6 for more than 350 days. The details and results of the operation are discussed below and illustrated in FIG. 3.

The cell was operated during the first 100 days at a current density of the cathode of 125 mA/cm$^2$ using "dry" oxygen. "Dry" oxygen means oxygen obtained directly from a commercially supplied cylinder. During this time, there was a slow, but steady decrease in the cathode potential (indicating a slowly lessening efficiency). On the 100th day of operation, power to the cell was stopped and the cell was drained of electrolyte. The cathode was removed and washed thoroughly with water. It was then replaced into the cell and the cell was restarted under the same conditions. A substantial anodic shift in the voltage was noted when the cell was restarted (indicating more efficient operation). This was thought to be the result of the water wash of the cathode to remove concentrated caustic which may have blocked some of the passageways of the porous electrode. Once again the potential slowly became more cathodic (indicating a lessening efficiency).

Beginning on the 135th day, the use of "wet" oxygen was initiated. "Wet" oxygen was produced by bubbling the "dry" oxygen through deionized water at about 80° Celsius prior to being fed to the cathode. The cell was operated at 125 mA/cm$^2$ of cathode area using "wet" oxygen until the 200th day. During this time, the previously noted changing potential leveled off and actually began to become more anodic. This improvement in performance was thought to be the result of the use of "wet" oxygen. "Wet" oxygen helps prevent build-up by reducing the rate of evaporation of water from the pores.

Beginning on the 200th day, the current density of the cathode was increased to about 150 mA/cm$^2$ of geometric cathode area. The use of "wet" oxygen was continued and the cell was operated under these conditions until the 300th day. Upon increasing the current density, an immediate increase in the voltage was noted. However, the voltage slowly but consistently became more anodic throughout the time period (indicating improved efficiency).

Beginning on the 300th day, the current density of the cathode was increased to about 200 mA/cm$^2$ of geometric cathode area. The use of "wet" oxygen was continued. Once again, an immediate change in voltage occurred (indicating lessening efficiency). However, this time a continued cathodic shift in the voltage was noted. This was thought to be the result of the formation of concentrated caustic solutions within the passageways of the cathode, in spite of the use of "wet" oxygen.

On the 330th day, cell operation was temporarily stopped, the cathode was removed, washed and replaced in the cell. Upon restarting the cell, an immediate, and substantial, improvement in performance was noted. During the following 30 days, a continued improvement in cell efficiency was noted.

What is claimed is:

1. A method for preparing a coated substrate suitable for use as an electrode comprising
applying a polymeric precursor to at least a portion of the surface of a substrate having a plurality of open, interconnecting passageways, and
converting at least a portion of the polymeric precursor into a propolymer with an infrared carbon-hydrogen absorption peak within the range of 600–900 cm$^{-1}$.

2. The method of claim 1 including dissolving or dispersing the polymeric precursor in a solvent prior to applying it to the surface of the substrate.

3. The method of claim 2 wherein the solvent is selected from the group consisting of acetone, and methylene chloride.

4. The method of claim 1 including heating the polymeric precursor to a temperature of from about 200° Celsius to about 1000° Celsius to form the pyropolymer.

5. The method of claim 4 wherein the polymeric precursor is heated at least about 30 minutes.

6. The method of claim 1 including depositing a metallic catalyst on at least a portion of the surface of the substrate prior to applying the polymeric precursor.

7. The method of claim 1 including depositing a metallic catalyst on at least a portion of the surface of the substrate after applying the polymeric precursor.

8. The method of claim 2 including dissolving or dispersing a metallic catalyst into the solvent.

9. The method of claim 1 wherein the polymeric precursor is selected from the group consisting of aromatic and polyaromatic organic compounds.

10. The method of claim 1 wherein the polymeric precursor is selected from at least one member of the group consisting of phenol-formaldehyde, polyvinyl alcohol, poly(2,6-diphenyl-p-phenylene oxide), acenaphthylene, phenolic resins, rayon, polyacrylonitrile and polyfurfuryl alcohol.

* * * * *

UNITED STATES PATENT AND TRADEMARK OFFICE
CERTIFICATE OF CORRECTION

PATENT NO. : 4,724,063

DATED : February 9, 1988

INVENTOR(S) : James A. McIntyre; Robert F. Phillips

It is certified that error appears in the above-identified patent and that said Letters Patent is hereby corrected as shown below:

Col. 1, line 57, "throught" should read -- thought --.

Col. 5, line 55, "precursors" should read -- precursor --.

Col. 8, line 8, "tool" should read -- took --;
   line 64, "elctroplate" should read -- electroplate --.

Col. 10, line 42, "found" should read -- formed --;
   line 51, "This" should read -- The --.

Col. 12, line 10 (in Claim 1), "propolymer" should read
-- pyropolymer --.

Signed and Sealed this

Eighteenth Day of October, 1988

*Attest:*

DONALD J. QUIGG

*Attesting Officer*　　　*Commissioner of Patents and Trademarks*